Sept. 13, 1966  R. LEVINE  3,272,876
CYCLOOLEFIN PRODUCTION
Filed June 14, 1962  2 Sheets-Sheet 1

INVENTOR
RALPH LEVINE
BY Beale and Jones
ATTORNEYS

A, tetrakis(triphenylphosphite) nickel
B, tris(triphenylphosphite) nickel carbonyl
C, bis(triphenylphosphite) nickel dicarbonyl ns of Serial No.
United States Patent Office 3,272,876
Patented Sept. 13, 1966

3,272,876
CYCLOOLEFIN PRODUCTION
Ralph Levine, Lake Charles, La., assignor, by mesne assignments, to Columbian Carbon Company, a corporation of Delaware
Filed June 14, 1962, Ser. No. 202,416
31 Claims. (Cl. 260—666)

This application is a continuation-in-part of Serial No. 82,546, filed January 31, 1961, now abandoned.

This invention is an improvement in making cycloolefins such as cyclooctadiene and cyclododecatriene by oligomerizing conjugated open chain diolefins such as butadiene. Specifically, the improvement is in methods of using catalysts or initiators which are complexes of zero-valent nickel, said complexes having organo-derivatives of phosphorous, arsenic, or antimony attached to the nickel by coordination bonds. No ordinary valence bonds of nickel are present in the catalysts which are used according to the invention. The novel concept of this invention is in the method of conducting the reaction with particular catalysts rather than in any novelty of the catalysts for the reactions involved.

The goal of this invention is to favorably alter the rate and extent of oligomerization, particularly dimerization, of a conjugated open chain diolefin to give a cycloolefin having eight carbon atoms in the ring and two double bonds in the ring, while giving variable yields of other cyclic oligomers having a greater number of carbon atoms in the ring such as trimers ($C_{12}$ ring) and tetramers ($C_{16}$ ring). "Byproducts" such as oily or resinous polymers and ring products having less than eight carbon atoms in the ring are kept to a minimum. Although it might seem that the best way to achieve a speedy reaction with good yields of product would be to maintain a high concentration of diolefin and catalyst, with prompt removal of the reaction products from the reaction zone, this is not the case.

It has now been found, with the specific catalysts used herein, that by maintaining a reaction mixture which is dilute with respect to the diolefin monomer and the catalyst, the diluent preferably consisting of all of the products of reaction and the reaction being continuous, the yields of desired cyclooligomers are greatly improved. The improvement is apparent in comparing results according to the present invention with results achieved by the use of continuous "once-through" reactors such as a tubular reactor of uniform cross section, conditions otherwise being similar. The same results are not achieved only by diluting with an inert solvent, which in some cases inhibits the reaction.

The aforementioned dilution by all of the products of reaction is achieved by a process step which may be called "backmixing." According to the invention this is performed by using an essentially continuous reactor which may be in one of several forms, and which defines a confined reaction zone. In one type of apparatus, the reaction zone is in the form of a tube or tubes, with backmixing being achieved by returning a large proportion of the effluent mixture to the inlet end of the tubular reactor; the process of using this apparaus is called external backmixing to distinguish it from processes of isolating unreacted materials which are then recycled. In another type of continuous reactor useful for the process of the invention, the reaction zone is in the form of a closed container or autoclave having means to provide rapid mixing of the contents, with an inlet means and an outlet means which are of small cross-sectional area as compared with the cross-sectional area of the container; the process of using apparatus of this form is called in situ backmixing or internal backmixing. Combinations of external and internal backmixing are also useful. The continuous process of the invention is preferably maintained by a constant feed of diolefin and catalyst, a constant withdrawal of reaction products, and constant backmixing, but essentially continuous reactions, in which repeated consecutive increments of the fluids are introduced into or removed from the reaction zone, as by a piston pump or a multicompartment rotary valve, are included by the phrase "continuous reactions." Although as suggested above an extraneous solvent may be detrimental, the effect of the added solvent is not so serious when backmixing is also used. For best results, extraneous solvents are excluded, as has been shown by prior work of others.

The annexed drawings illustrate schematically several forms of suitable apparatus, as well as illustrating graphically that optimum conditions exist for particular catalysts using internal backmixing.

Figure 3:
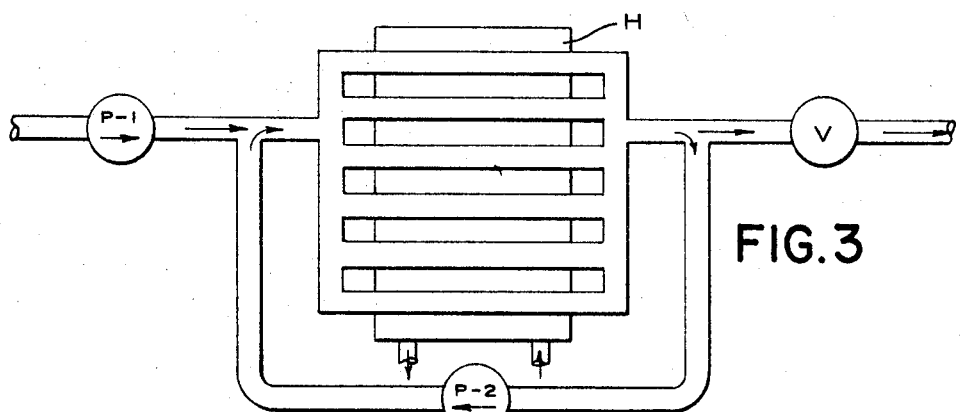
Figure 4:
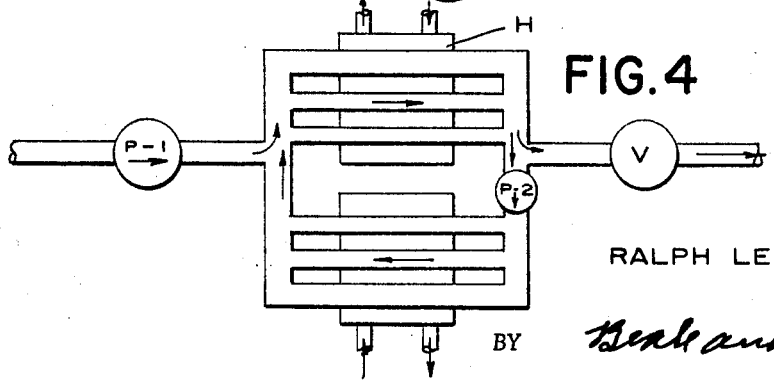

Similar elements appear in FIGURES 3 and 4, with multiple tube reactors being employed.

Figure 5:
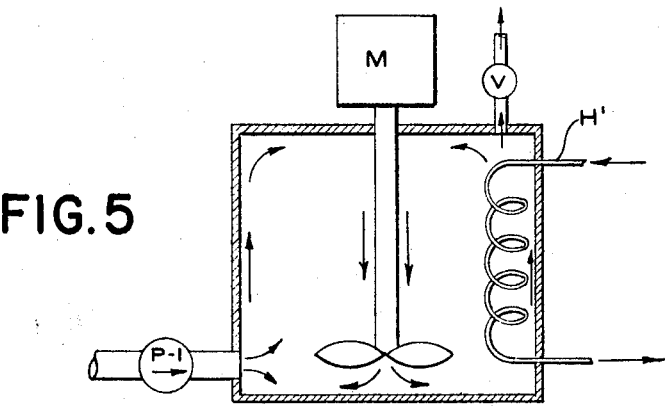

FIGURE 5 shows an autoclave type of reactor with small inlet and outlet conduits as compared with a sectional area of the autoclave, a heat exchange coil H' being placed within the autoclave, and a motor-driven stirrer M being used. This apparatus provides internal backmixing.

Figure 6:
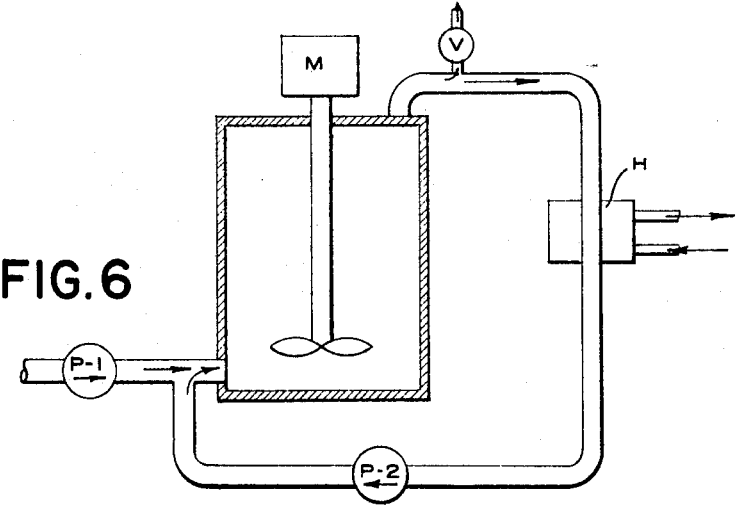

FIGURE 6 has similarities to FIGURE 5, but gives a combination of internal backmixing (FIG. 5) and external backmixing (FIGS. 1-4) with convenience in temperature control. As will be obvious to those skilled in the art, any apparatus which provides efficient backmixing is useful. Baffles, mixing pumps, and other known elements may be used with the apparatus of FIGS. 1-6 to give efficient mixing.

Figure 7:
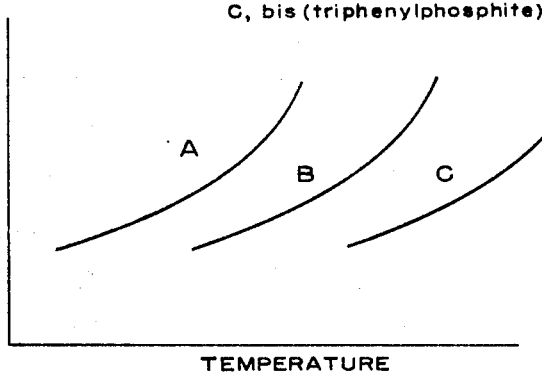

FIGURE 7 illustrates that optimum or critical relationships, for conversion of diolefin to the desired products, exist with regard to temperature and the mass flow rate, assuming efficient backmixing, and that similarities exist as to specific related catalysts.

The particular catalysts for which the invention is found to be useful have the general empirical formula

$$[(RO_a)_3Z]_xNi(CO)_{4-x}$$

wherein R is an organic radical, Z is the element phosphorus, arsenic or antimony, said element being in the trivalent state, "$a$" is one or zero, and "$x$" is one, two, three, or four. Different radicals "R" may be associated directly or thruogh oxygen with any one Z, and where $x$ is more than one, a plurality of the compounds of one or more of the elements phosphorus, arsenic, or antimony may be associated with a single nickel atom. The nickel is zero-valent or $Ni^0$; that is, the catalyst is a complex in which the four associated molecules are bonded to the nickel only by coordination volences.

The radicals R are organic radicals, preferably consisting of hydrogen and carbon, the hydrocarbon radicals. The radicals R, however, may be substituted hydrocarbons, for example the substituents being made up of hydrogen and carbon, halogen, nitrogen, sulphur, and/or oxygen. Also, one or more of the radicals R may be a heterocyclic radical. Examples of open-chain alkyl radicals, preferably having less than about 20 carbon atoms, as the radical R, are methyl, ethyl, propyl, butyl, and homologous radicals such as hexyl, dodecyl, isooctyl, isobutyl, and isopentyl. Useful cycloalkyl hydrocarbon radicals include cyclopentyl, cyclohexyl, cyclooctyl, and similar groups. Representative aryl radicals are phenyl, biphenyl, α-naphthyl, and β-naphthyl.

Suitable halogens are chlorine, fluorine, bromine, and iodine. Examples of halogen substituted radicals are p-chlorophenyl, 2-chloroethyl, m-(trifluoromethyl)phenyl, bromocyclohexyl, 1-iodopropyl, and similar radicals. Representative alkyl-aryl radicals are m-tolyl, p-tolyl, o-tolyl, and 3,4-xylyl. Arylalkyl radicals according to the invention are represented by the benzyl and benzhydryl radicals. Other useful substituted hydrocarbon radicals include p-methoxyphenyl and p-acetophenyl. Known homologous radicals provide further useful variants. Heterocyclic radicals which are useful include tetrahydrofurfuryl and pyridyl.

For example, various tri-substituted nickel monocarbonyl compounds are useful. Examples of compounds wherein the radicals are the same are tris(triphenylphosphite) nickel monocarbonyl, tris(tri-p-toly phosphite) nickel monocarbonyl, tris(tri-2-chloroethylphosphite) nickel monocarbonyl, tris(triphenylphosphine) nickel monocarbonyl, tris-(tricyclohexylphosphine) nickel monocarbonyl, and similar compounds within the above-defined formulas. Instances of catalysts prepared so that the radical "R" varies within a given catalyst are bis(triphenylphosphite)tritolyphosphite nickel monocarbonyl, bis(triphenylphosphite)-triethylphosphite nickel monocarbonyl, and tris (mixed 2-ethyl-hexyl-octyl-phenylphosphite) nickel monocarbonyl. Similar variations may be made where phosphine compounds are utilized, and both phosphine and phosphite compounds may be bonded to the $Ni^0$. Examples of such compounds are bis(triphenylphosphite)triphenylphosphine nickel monocarbonyl), and bis(triphenylphosphine)triphenylphosphite nickel monocarbonyl. Comparable compounds for example derived from $Ni(CO)_4$ but with arsines, arsenites, stibines, and/or antimonites substituted for the phosphines and phosphites are useful. The specified tri-substituted nickel monocarbonyl compounds are, in general, suitably replaced by the disubstituted nickel dicarbonyl, monosubstituted nickel tricarbonyl, or tetra-substituted nickel compounds having comparable radicals "R" in the above formula.

The similar tetra-substituted compounds are often more effective than the tri-substituted, bi-substituted, or mono-substituted derivatives. For instance, tetrakis(triphenylphosphite) nickel is more effective than tris(triphenylphosphite) nickel monocarbonyl, which in turn is more effective than bis(triphenylphosphite) nickel dicarbonyl; each of these is an excellent catalyst which is useful in carrying out this invention, and their relative effectiveness at a given temperature is shown approximately in FIG. 7. Methods of preparing the compounds or complexes used as catalysts or initiators herein are described in the literature with the exception of the tetra-substituted complexes such as tetrakis(triphenylphosphite) nickel. The latter compound and similar compounds may be prepared by methods such as shown in Clark application Serial No. 83,875, filed January 23, 1961, now Patent No. 3,152,158.

A suitable method of introducing the catalyst is to dissolve it in an inert solvent, preferably a reactant or product of the reaction. Excellent results are achieved by dissolving the catalyst in the liquid reactor effluent containing all of the products of reaction, and then to meter the solution into the reactor or into the stream of diolefin being introduced into the reactor. Usually all but small quantities of diolefin are removed from the reactor effluent before it is used as the catalyst solvent. Similarly, the diolefin itself is useful as the catalyst solvent in many cases. Another alternative is to use a product of reaction, such as cyclooctadiene as the catalyst solvent. Less preferably an inert solvent, such as a paraffinic hydrocarbon liquid, is useful. In some cases, such as when the catalyst is not soluble at temperatures substantially below the reaction temperature, it may be introduced as a slurry. Other methods of introducing the catalyst will be apparent to those skilled in the art. Known catalyst activators, such as isobutylene, bicyclo-heptadiene, and others may be added with the catalyst or separately.

The concentration of catalyst used in the reaction is suitably 0.001% to 10% based on the weight of the conjugated diolefin monomer which is fed to the reactor, and the preferred quantity is between 0.05% and 4% by weight. Excessive quantities of catalyst are not proportionately beneficial. Excellent results have been achieved at catalyst concentrations of 0.2%, 0.5%, 1.5%, and 3%.

Pressures between about 3.5 and about 70 kilograms per square centimetre gauge or higher are applicable, usually depending upon the temperature at which the reaction is conducted. Best results are obtained at a pressure between about 14 and 42 kilograms per square centimetre gauge, and greater than the vapor pressure of the reaction mixture at the temperature used to maintain a liquid phase.

Polymerization inhibitors which may be present if desired include phenol, catechol, p-tertiary butyl catechol, resorcinol, hydroquinone, and other known compounds. Although no particular benefit is achieved, polymerization inhibitors may actually be removed from the diolefin, by means such as pellets of potassium hydroxide, prior to the reaction. If such inhibitors are present and are not removed, the amounts thereof may be between about 0.001% and 4% on the weight of the open-chain conjugated diolefin. It is not unsual to find that amounts in this range have been added to materials such as butadiene to stabilize them during storage. For example, between about 5 p.p.m. and 100 p.p.m. of p-tertiary-butyl catechol has little effect upon the conversion of butadiene or selectively for the desired products.

Although not preferred, solvents which may be used include paraffinic, cycloparaffinic, olefinic, cycloolefinic and aromatic hydrocarbons, including benzene, toluene, petroleum naphtha, hexane, heptane, isooctane, cyclo-hexane, cyclopentane, cyclooctadiene and similar materials. Other solvents known to be useful for similar reactions, such as tetrahydrofuran are permissible. Most desirably, the only materials present in the reaction zone in substantial quantities are the diolefin monomer, the catalyst, and the products of reaction.

The diolefin should be relatively pure, although it may comprise relatively small amounts of impurities inherently present such as water, monoolefins, 1,2-diolefins, carbonyl compounds, and acetylenes. Normally these materials inherently appear in "plant" butadiene in amounts between about 10 p.p.m. (parts per million) and 500 p.p.m., by weight. Excessive amounts of certain impurities react with the catalyst or are detrimental in other ways and if not removed, are wasteful of catalyst, for example. The quantity of water in the diolefin monomer may be reduced by freezing or by the use of desiccants or dehydrating agents such as calcium sulfate (e.g. "Drierite"), calcium carbide, calcium oxide, or others known in the art. Ferrous salts, thiosulfites, sulfites, or other materials may be used to reduce peroxide compounds. Drying agents which unduly heat the diolefins are to be avoided. Desiccants which adsorb or otherwise adversely affect the catalyst are used on the monomer before it is mixed with the catalyst.

Best results are obtained where relatively dry materials are introduced into the reaction zone. The catalyst, solvent (if used), and monomer should contain no more water than will give about 500 p.p.m. (parts per million) by weight of water in the liquid reaction mixture. For example, using no extraneous solvent and a dry catalyst with butadiene, reduction of the water content of the diolefin to about 100 p.p.m. gives excellent results; in fact, no better results are apparent when the moisture is reduced to 50 p.pm. or below. Excessive moisture reduces both total conversion and selectivity for cyclooligomers having eight or more ring carbons.

The starting material for this invention is a conjugated open-chain diolefin, preferably one which is in a gaseous or vapor state at room temperature and atmospheric pressure, and preferably 1,3-butadiene. Other conjugated open-chain diolefins, particularly 1,3-diolefins, include 2-methyl-1,3-butadiene (isoprene); 1,3-pentadiene (piperylene); phenyldiolefins; 2-chloro-1,3-butadiene (chloroprene); 2,3-dichloro-1,3-butadiene; and 2,3-dimethyl-1,3-butadiene. Other compounds which form cycloolefins having at least eight carbon atoms in the ring may also be used, an example being 2,4-hexadiene.

Butadiene-1,3 (called "butadiene" herein) is the preferred monomer, and wherever preferred conditions are given, they apply to this diolefin. Other open-chain conjugated diolefins are useful as pointed out above, and optimum conditions for these monomers are within the broader ranges of useful conditions specified.

Figure 1:
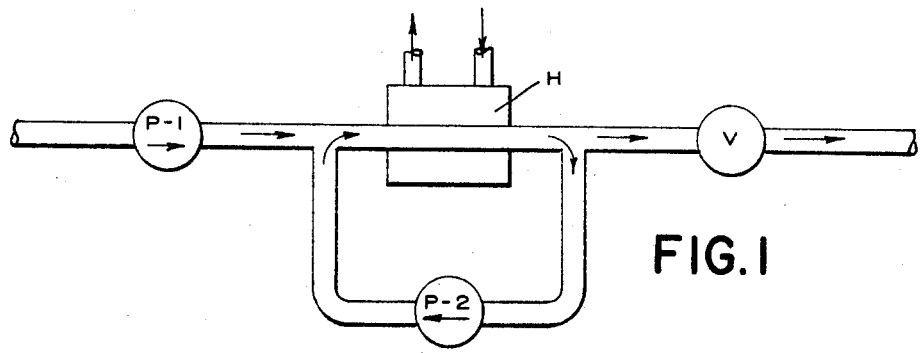
FIGURE 1 shows a continuous tubular reactor having a feed pump P-1 a backmixing pump P-2, a heat exchanger H, and an outlet valve V.
Figure 2:
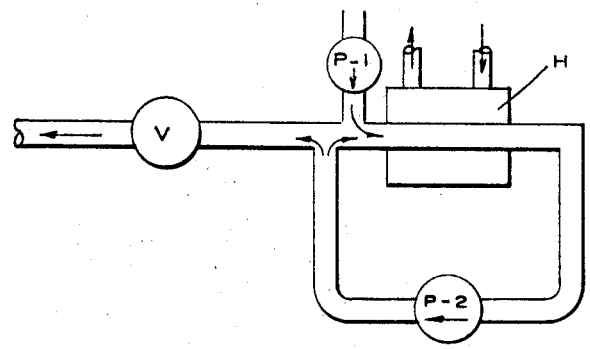
FIGURE 2 is similar but with the relative locations of the inlet and outlet modified.

The step of backmixing is carried out in a manner which will give a relatively uniform reaction mixture composition throughout the reactor. Immediately after introduction of the diolefin, it is diluted with and thoroughly commingled with the liquid reaction mixture. It is to be understood that the reaction mixture is not necessarily completely uniform. Thus, in the brief time that it takes the reaction mixture to pass through the multiple reaction tubes and through pump P–2 (FIG. 3), a small proportion of the diolefin present will have reacted. This is one way to gauge and control the extent of backmixing. The highest concentration of diolefin occurs immediately downstream of the point of introduction of the diolefin after backmixing of the returned stream of reaction mixture with the diolefin. The lowest concentration of diolefin occurs in the stream of reaction mixture at another point. In FIG. 1, the lowest concentration of diolefin in the reactor would be in the stream returned for backmixing, at the point just prior to backmixing the returned stream with the introduced diolefin. In FIG. 5, assuming the agitating means is such as to induce a flow pattern resembling that shown by the arrows of this figure, the highest concentration of diolefin after backmixing would appear near the reactor walls at about the level of the propeller. The lowest concentration of diolefin for apparatus such as FIG. 5 would appear in the backmix stream near the propeller shaft, also at about the level of propeller. It is preferred that the highest concentration of diolefin in the reaction mixture (by weight) after backmixing, be no more than about 10% higher than the lowest concentration of diolefin in the reaction mixture. Best results are obtained where this difference is less than about 5% of the lowest concentration of diolefin in the mixture. Less desirably, this difference may be as great as about 50%. Known reliable sampling techniques with samples being taken some distance from the feed inlet, are used in determining such difference, of course.

The quantity of reaction mixture, containing all of the products of reaction, which is backmixed with newly introduced diolefin is an important aspect of the invention. The weight of newly introduced diolefin is substantially the same as the weight of material withdrawn from the reactor for conveying to means for recovery of the product, such as a distillation column. The terms "feed," "diolefin feed" or "feed stream of diolefin"; "backmix stream" or "backmix"; and "product stream" or "product" are used to describe the corresponding liquid streams or quantities. The weight ratio of the backmix to the feed is greater than about 1 to 1. The upper limit on this ratio is controlled only by economic factors, and a weight ratio of backmix to diolefin feed of 200 to 1, or higher, is useful. Using only external backmixing apparatus such as that of FIG. 3, the weight ratio of backmix circulated through pump P–2 to feed introduced through pump P–1 (or for every unit of reaction mixture withdrawn through valve V as final reaction product) is suitably between about 1 to 1 and 100 to 1, or higher. Excellent results are economically attained when this external backmixing ratio is between about 30 to 1 and 50 to 1, and the latter range of ratios is preferred for this type of reactor. Using only internal backmixing, as in FIG. 5, the weight ratio of backmix to feed is suitably between about 1 to 1 and 200 to 1, or higher. Preferably this internal backmixing ratio is between about 50 to 1 and 200 to 1, taking into account both economy and efficiency.

Correlated with the need for efficient agitation and backmixing, as described in the preceding paragraphs, is the critical relationship of the quantity of diolefin introduced (or quantity of reaction mixture withdrawn as final product) per unit of time as compared with the quantity of reaction mixture present in the reaction zone. This mass flow rate of the diolefin is expressed herein as grams of diolefin introduced per millilitre of flooded reactor volume per hour. This quantity depends in part upon the temperature and the products desired, as well as the catalyst identity. If the reactor is not completely filled with liquid reaction mixture and there is a vapor or gas space present, only the portion of the reactor volume which is occupied by liquid is used in calculating the mass flow rate. Other units than g./ml.-hr. may be used.

The temperature of reaction is between about 40° C. and 250° C., more preferably between about 100° C. and 190° C. Within the broader temperature range, the critical mass flow rate with backmixing according to the invention is between about 0.01 gram and 10 grams of diolefin introduced per millilitre of reaction space occupied by liquid per hour; this corresponds approximately to an average residence time for a given increment of diolefin of between about 80 hours and 0.08 hour. More preferably, at a temperature between about 100° C. and 190° C., the mass flow rate is between about 0.1 and 4.0, which corresponds to an average residence time of between about 8 hours and 0.2 hour. The specified conditions are of course related to the extent of conversion of diolefin and yields of individual products.

For particular diolefins and catalysts, it is possible to control the conditions to give enhanced yields of certain products in preference to others. Thus, using butadiene (BD) as the monomer and tris-(triphenylphosphite) nickel monocarbonyl as the catalyst, it has been found that, with proper backmixing, yields of 1,5-cyclooctadiene (COD) are enhanced at temperatures between about 100° C. and 160° C. and a mass flow rate (MFR) of butadiene concentration in the reaction mixture of from about 3% to 20% while comparatively low yields of 1,5,9-cyclododecatriene (CDT) are obtained. On the other hand, with the same catalyst, it has been found that at a mass flow rate of butadiene of between about 1.0 and 10 g./ml.-hr., with the temperature between about 160° C. and 220° C., the yield of the higher molecular weight cyclooligomer, 1,5,9-cyclododecatriene is enhanced, while a diminished yield of cyclooctadiene is obtained. A butadiene concentration of about 20% to 60%, an upper limit of 4.0 on the MFR and an upper limit on the temperature of 200° C. are preferred.

As is seen from the above, another criteria is the combination of mass flow rate, temperature, and catalyst concentration, for a specific catalyst, such that the preferred concentration of butadiene in the liquid reaction mixture, a dependent variable, be between about 3% and 20% by weight of butadiene based on reaction mixture for optimum selectivity to 1,5-cyclooctadiene and between about 20% and 60% by weight of the butadiene for optimum selectivity to 1,5,9-cyclododecatriene. This dependent variable is determined by the rate of reaction, which is controlled by temperature, mass flow rate, catalyst identity and concentration, and similar variables. This control of diolefin concentration is readily achieved by altering one or more variables subject to direct control.

For best yields of both cyclooctadiene and cyclododecatriene, using tris(triphenylphosphite) nickel carbonyl, the MFR is 0.01 to 4.0 g./ml.-hr., the temperature is 120° to 200° C., and in a further improvement, the reaction is controlled to give a butadiene concentration of 5 to 60%.

Using the catalyst bis(triphenylphosphite) nickel dicarbonyl, the following conditions are preferred:

(a) For best yields of both COD and CDT:
MFR, g./ml.-hr. _____ 0.1 to 4.0
Temp., °C. _____ 140 to 190
BD Conc., percent _____ 5 to 50

(b) For best yields of COD:
MFR, g./ml.-hr. _____ 0.01 to 1
Temp., °C. _____ 120 to 180
BD Conc., percent _____ 5 to 25

(c) For best yields of CDT:
MFR, g./ml.-hr. _____ 1 to 5
Temp., °C. _____ 150 to 200
BD Conc., percent _____ 25 to 60

Optimum conditions exist for other catalysts and monomers. Generally, lower temperatures and lower mass flow rates, at a given catalyst concentration, favor the formation of cyclooctadienes, while higher temperature, diolefin concentrations and mass flow rates favor the formation of higher cyclooligomers, having twelve or more carbon atoms in the ring.

In most of the runs of the following examples the diolefin was predried to 100-150 p.p.m. (parts per million) of water before admixture with the catalyst, which was dissolved in either the diolefin feed or in "crude" reactor effluent. No correction was made in the conversion figure where crude was used as the catalyst solvent or where impure recovered diolefin was used as the monomer, since small amounts of products such as cyclooctadiene which were introduced do not ordinarily change the conversion figure beyond that due to the normal experimental error. Drying agents used included calcium sulfate ("Drierite"), which lowered the water content of the feed to about 100-150 p.p.m., depending on the age of the drying agent, or a mixture of barium oxide and calcium sulfate, which reduced the water content to less than about 50 p.p.m. when fresh. In some runs, the diolefin feed and catalyst (dissolved either in the diolefin or in crude) were mixed, and the mixture then dried. Deviations from these procedures are indicated in the examples. All percentages in this specification are by weight, unless otherwise indicated.

The abbreviations and product analyses values used herein have the following significance:

BD=butadiene
COD=cyclooctadiene
CDT=cyclododecatriene
VCH=1,4-vinylcyclohexene
MFR=mass flow rate (in g./ml.-hr.)
HBM=higher boiling materials; all material boiling above COD, including catalyst and CDT.
Nonvolatiles in BD=Products which appear as less volatile impurities in recovered butadiene, such as COD and VCH.
Crude=reactor effluent after removal of most of the diolefin, if volatile.

$$\text{Conversion, percent} = \frac{\text{wt. diolefin to products}}{\text{wt. diolefin fed}} \times 100$$

$$\text{Selectivity, percent} = \frac{\text{wt. specific product}}{\text{wt. diolefin to products}} \times 100$$

$$\text{Yield, percent} = \frac{\text{wt. specific product}}{\text{wt. diolefin fed}} \times 100$$

Diolefin concentration, percent =
$$\frac{\text{wt. of unreacted diolefin}}{\text{wt. of diolefin \& diolefin products}} \times 100$$

EXAMPLE 1

The reactor was a 100 ml. agitated autoclave similar to that of FIG. 5. Unless otherwise indicated, in this the following examples, the monomer was "plant" butadiene containing small amounts of acetylenes (up to about 600 p.p.m.), with small amounts of other impurities such as propene and butenes, which also contained about 50-75 p.p.m. of the polymerization inhibitor p-tertiary butyl catechol, with the water content being reduced to in the neighborhood of 100 p.p.m. by flowing it through anhydrous calcium sulfate granules (e.g. "Drierite").

In this example the catalyst was bis(triphenylphosphite) nickel dicarbonyl. The 100 ml. reactor was a vertical cylinder about 8 in. high by 1 in. in diameter. The reactor contents were vigorously agitated by means of a disk type agitator, the disks being mounted at its center on a rod which moves axially first in one direction and then in the opposite, operated at about 60-120 cycles per minute. A heat exchange jacket was used to maintain the desired reaction temperature. Feed of monomer and withdrawal of product was continuous.

The weight ratio of backmix to feed was greater than about 30 to 1, and the concentration of diolefin throughout the reaction zone was relatively uniform.

EXAMPLE 2

This example was conducted similarly to Example 1, but using a two litre reactor. The two litre reactor was a vertical cylinder such that its diameter was about one-half its length. Intense agitation was provided by means

*Table I*

| Run No. I- | 1 | 2 | 3 | 4 | 5 | 6 | 7 | 8 | 9 | 10 |
|---|---|---|---|---|---|---|---|---|---|---|
| Cat. Conc., percent | 0.71 | 0.71 | 0.71 | 0.71 | 0.75 | 0.75 | 0.75 | 0.75 | 1.5 | 1.5 |
| Temp., °C | 180 | 180 | 150 | 150 | 150 | 180 | 150 | 180 | 180 | 180 |
| Mass Flow Rate, g./ml.-hr | 2.29 | 5.07 | 2.19 | 3.82 | 2.07 | 1.28 | 2.34 | 2.35 | 4.94 | 1.29 |
| Pressure, kilograms per square centimetre gauge | 42 | 42 | 42 | 42 | 42 | 42 | 42 | 42 | 42 | 42 |
| Percent Conversion, BD | 90.7 | 91.2 | 91.5 | 80.5 | 67.6 | 58.0 | 78.0 | 90.2 | 86 | 90 |
| Percent Selectivity, COD | 60.1 | 61.2 | 63.3 | 63.0 | 45.5 | 63.7 | 59.7 | 63.3 | 58.0 | 64.0 |
| Percent Selectivity, VCH | 16.7 | 14.6 | 12.5 | 12.0 | 18.3 | 11.7 | 10.8 | 12.2 | 12.9 | 10.8 |
| BD Feed Treatment: | | | | | | | | | | |
| Dried | Yes | Yes | Yes | Yes | [1] No | [1] No | Yes | Yes | (As a rule the BD Feed was dried.) | |
| KOH [2] | No | No | No | No | No | No | Yes | Yes | | |

| Run No. I- | 11 | 12 | 13 | 14 | 15 | 16 | 17 | 18 | 19 | 20 | 21 |
|---|---|---|---|---|---|---|---|---|---|---|---|
| Cat. Conc., percent | 1.5 | 1.5 | 0.75 | 0.75 | 0.75 | 0.75 | 0.2 | 0.2 | 0.1 | 0.1 | 0.05 |
| Temp., °C | 150 | 150 | 180 | 180 | 150 | 150 | 180 | 180 | 180 | 180 | 180 |
| Mass Flow Rate, g./ml.-hr | 4.88 | 1.55 | 4.10 | 1.38 | 4.32 | 1.44 | 4.07 | 1.59 | 6.20 | 2.43 | 1.14 |
| Pressure, kilograms per square centimetre gauge | 42 | 42 | 42 | 42 | 42 | 42 | 42 | 42 | 42 | 42 | 42 |
| Percent Conversion, BD | 63 | 79 | 85 | 89 | 57 | 76 | 75 | 84 | 67 | 87 | 52 |
| Percent Selectivity, COD | 56.4 | 66.0 | 59.1 | 65.9 | 48.7 | 62.8 | 50.0 | 60.0 | 41.8 | 49.0 | 27.0 |
| Percent Selectivity, VCH | 16.5 | 12.9 | 12.3 | 11.7 | 10.1 | 9.9 | 12.6 | 12.4 | 14.5 | 12.8 | 36.9 |
| Percent Selectivity, HBM | 27.1 | 21.1 | 28.6 | 22.4 | 41.2 | 27.3 | 37.4 | 27.6 | 43.7 | 38.2 | 36.1 |

[1] Undried diolefin contained about 400-600 p.p.m. water.
[2] For removal of polymerization inhibitor.

of a 3.8 centimetre marine propeller spaced 1.3 to 2.5 centimetres from the bottom and rotated at 400–600 r.p.m. Additional turbulence was provided by four radially-directed longitudinal fins attached to the inner cylindrical surface of the autoclave. Cooling coils were used to dissipate the heat of reaction and to maintain the desired temperature.

The weight ratio of backmix to feed was greater than about 30 to 1, and the concentration of diolefin throughout the reaction zone was relatively uniform.

Table II

| Run No. II- | 1 | 2 | 3 | 4 | 5 | 6[1] | 7 | 8 |
|---|---|---|---|---|---|---|---|---|
| Cat. Conc., Percent | 0.2 | 0.5 | 0.5 | 0.5 | 0.5 | 0.5 | 0.3 | 0.3 |
| Temp., °C | 160 | 160 | 170 | 170 | 170 | 170 and 180 | 160 and 170 | 180 |
| Mass Flow Rate, g./hr.-ml | 0.60 | 0.86 | 1.02 | 0.83 | 1.06 | 1.17 | 1.0 and 0.96 | 0.93 |
| Pressure, kilograms per square centimetre gauge | 35 | 28 | 28 | 28 | 28 | 28 | 28 | 28 |
| Percent Conversion, BD | 89.5 | 82.4 | 86.0 | 92.4 | 89.6 | 70.9 | 89.7 and 91.6 | 92.0 |
| Percent Selectivity, COD | 69.5 | 67.3 | 70.8 | 67.9 | 67.0 | 49.9 and 43.4 | 63.8 and 62.8 | 64.8 |
| Percent Selectivity, VCH | 12.6 | 13.4 | 13.4 | 14.0 | 15.0 | 23.3 and 27.7 | 14.75 and 14.9 | 15.1 |
| Percent BD in Crude | 2.0 | 2.3 | 1.1 | 3.6 | 2.2 | 6.3 and 4.3 | 3.2 and 3.9 | 5.0 |
| Percent Nonvolatiles in BD | | 4.6 | 8.4 | 8.0 | 0.2 | Nil | | |

[1] In Run II-6 no drying agent was used and 0.2% $H_2O$, by weight, was added to the butadiene feed.

EXAMPLE 3

Tris(triphenylphosphite) nickel carbonyl was the catalyst used in this example the two litre reactor being used in each case.

Table III

| Run No. III- | 1 | 2 | 3 | 4 | 5 | 6 | 7 | 8 | 9 | 10 |
|---|---|---|---|---|---|---|---|---|---|---|
| Water in BD, p.p.m. | | | | | 60 | 470 | | | | |
| Inhibitor in BD, p.p.m.[1] | | | | | 5 | 15 | | | | |
| Cat. Conc., percent wt | 1.5 | 1.5 | 0.5 | 0.5 | 0.5 | 0.5 | 0.3 | 0.3 | 0.5 | 0.5 |
| Temp., °C | 150 | 170 | 150 | 170 | 150 | 150 | 150 | 130 | 170 | 160 |
| Mass Flow Rate, g./hr.-ml | 1.00 | 1.03 | 1.03 | 0.98 | 0.69 | 0.72 | 0.98 | 0.93 | 0.93 | 0.8 |
| Pressure, kilograms per square centimetre gauge | 28 | 28 | 28 | 28 | 28 | 28 | 28 | 28 | 28 | 28 |
| Percent Conversion, BD | 90.6 | 95.8 | 91.7 | 91.1 | 95.2 | 87.8 | 96.4 | 58.6 | 94.2 | 91.8 |
| Percent Selectivity, COD | 80.4 | 75.8 | 79.8 | 74.3 | 76.6 | 69.4 | 67.7 | 66.0 | 74.9 | 75.9 |
| Percent Selectivity, VCH | 11.2 | 12.7 | 9.8 | 11.2 | 10.3 | 11.3 | 11.3 | 10.2 | 12.3 | 11.7 |

| Run No. III- | 11 | 12 | 13 | 14 | 15 | 16 | 17 | 18 | 19 | 20 |
|---|---|---|---|---|---|---|---|---|---|---|
| Cat. Conc., percent wt | 0.5 | 0.5 | 0.5 | 0.5 | 1.5 | 0.5 | 0.5 | 0.5 | 0.5 | 1.5 |
| Temp., °C | 150 | 130 | 140 | 150 | 130 | 160 | 120 | 120 | 170 | 120 |
| Mass Flow Rate, g./hr.-ml | [2]0.7 | 0.27 | 0.34 | [2]0.35 | [2]1.0 | [2]0.3 | 0.34 | [2]0.34 | 0.31 | [2]0.3 |
| Pressure, kilograms per square centimetre gauge | 28 | 28 | 28 | 28 | 28 | 28 | 28 | 28 | 28 | 28 |
| Percent Conversion, BD | [2]90 | 85 | 88.3 | 85 | 73.7 | [2]95 | 75.2 | [2]75.2 | 90.8 | [2]84 |
| Percent Selectivity, COD | 80.1 | 83.3 | 78.3 | 72.8 | 77.6 | 71.7 | 80.5 | 69.2 | 81.5 | 75.4 |
| Percent Selectivity, VCH | 10.0 | 7.3 | 9.6 | 7.9 | 9.0 | 9.6 | 8.1 | 9.4 | 10.2 | 8.8 |

| Run No. III- | 21 | 22 | 23 | 24 | 25 | 26 | 27 | 28 | 29 | 30 |
|---|---|---|---|---|---|---|---|---|---|---|
| Cat. Conc., percent wt | 0.5 | 0.5 | 0 5. | 0.5 | 0.5 | 0.5 | 0.5 | 0.5 | 05. | 0.5 |
| Temp., °C | 150 | 150 | 150 | 150 | 150 | 150 | 150 | 130 | 120 | 140 |
| Mass Flow Rate, g./hr.-ml | [2]1.0 | 0.8 | [2]0.9 | [2]0.9 | 0.9 | [2]0.9 | [2]0.9 | 0.07 | 0.07 | 0.07 |
| Pressure, kilograms per square centimetre gauge | 28 | 28 | 58.8 | 58.8 | 58.8 | 12.6 | 12.6 | 28 | 28 | 28 |
| Percent Conversion, BD | | 77.5 | [2]84 | [2]84.0 | 84.4 | [2]84.0 | [2]84.0 | 93.2 | 95.2 | 95.6 |
| Percent Selectivity, COD | 73.2 | 65.1 | 72.5 | 76.9 | 74.9 | 78.1 | 77.9 | 78.0 | 77.6 | 78.6 |
| Percent Selectivity, VCH | 9.7 | 10.3 | 8.4 | 11.2 | 8.8 | 11.2 | 11.3 | 9.2 | 8.7 | 8.8 |

| Run No. III- | 31 | 32 | 33 | 34 | 35 | 36 | 37[3] | 38[4] | 39 | 40 |
|---|---|---|---|---|---|---|---|---|---|---|
| Cat. Conc., percent wt | 0.5 | 0.5 | 0.5 | 0.5 | 0.5 | 0.5 | 0.5 | 0.5 | 0.5 | 0.5 |
| Temp., °C | 150 | 150 | 145 | 110 | 100 | 150 | 150 | 150 | 170 | 160 |
| Mass Flow Rate, g./hr.-ml | 0.07 | 1.0 | 0.99 | 0.08 | 0.07 | [2]0.18 | [2]1.0 | [2]1.0 | 2.6 | 2.0 |
| Pressure, kilograms per square centimetre gauge | 28 | 28 | 28 | 28 | 28 | 28 | 28 | 28 | 35 | 35 |
| Percent Conversion, BD | 96.0 | 76 | 82.1 | 93.4 | 87.9 | [2]94.0 | [2]75.0 | [2]75.0 | 90.2 | 75.8 |
| Percent Selectivity, COD | 74.6 | 77.0 | 75.9 | 76.0 | 74.1 | 78.1 | 81.0 | 81.4 | 66.8 | 64.9 |
| Percent Selectivity, VCH | 12.0 | 9.9 | 7.6 | 8.7 | 8.6 | 8.7 | 11.9 | 11.1 | 11.5 | 11.4 |

| Run No. III- | 41 | 42 | 43 | 44 | 45 | 46 | 47 | 48 | 49 | 50 |
|---|---|---|---|---|---|---|---|---|---|---|
| Cat. Conc., percent wt | 0.5 | 0.5 | 0.5 | 0.5 | 0.5 | 0.5 | 0.5 | 0.5 | 0.5 | 0.5 |
| Temp., °C | 150 | 180 | 180 | 180 | 140 | 140 | 190 | 160 | 170 | 180 |
| Mass Flow Rate, g./hr.-ml | 2.0 | 2.7 | [2]2.7 | 2.7 | 2.2 | 2.2 | 2.0 | 4.2 | 3.3 | 3.6 |
| Pressure, kilograms per square centimetre gauge | 35 | 35 | 35 | 35 | 35 | 35 | 35 | 35 | 35 | 35 |
| Percent Conversion, BD | 45.5 | 58.3 | [2]58.3 | [2]58.3 | [2]8.1 | [2]8.1 | 86.1 | 52.3 | 70.7 | 80.5 |
| Percent Selectivity, COD | 54.2 | 50.0 | 46.6 | 47.8 | 45.5 | 45.6 | 67.0 | 57.2 | 65.0 | 65.0 |
| Percent Selectivity, VCH | 13.2 | 19.0 | 27.7 | 21.6 | 25.6 | 29.6 | 13.0 | 11.3 | 11.4 | 10.4 |
| Percent Selectivity, CDT | | | [5]16.7 | [5]19.8 | [6]10–11 | [6]7.6 | | | | |

[1] p-Tertiary butyl catechol; this amount or more present in most cases.
[2] Approximate value. For instance, in sampling product, at times an unsealed container was used for convenience.
[3] Recovered BD used as feed; sample taken after drying and before adding catalyst. Analysis follows: "Non-volatiles", 9.0% total in BD; COD in non-volatiles, 68.8%; VCH in non-volatiles, 9.1%. The conversion of butadiene was calculated to include incoming crude COD.
[4] Recovered BD feed. The conversion of butadiene was calculated to include incoming COD crude.
[5] Preliminary analyses reporting the total of two isomers; CDT selectivity high. At about 150° C. and MFR of 1.0 g./ml.-hr., CDT selectivity is usually less than 5% with this catalyst.
[6] Runs III-45 and -46 closure unusually low, 92.1%; ordinarily about 97–100%.

EXAMPLE 4

The procedure and catalyst of Example 2 were followed to determine the effect of an extraneous inert solvent. Such solvent may be used, but it was found that somewhat better results are attained in the absence of substantial amounts of said solvent. Two series of samples were taken, the values given below being the averages of four consecutive samples taken from each run.

*Table IV*

| Run No. IV– | 1 | 2 |
|---|---|---|
| Cat. Conc., percent wt. BD | 1.5 | 1.5 |
| Temperature, ° C | 150 | 150 |
| Mass Flow Rate, g./hr.-ml | 0.9 | ¹ 1.0 |
| Pressure, kilograms per square centimetre gauge | 28 | 28 |
| Percent Conversion, BD | 85.0 | 76.0 |
| Percent Selectivity, COD | 77.3 | 66.5 |
| Percent Selectivity, VCH | 8.8 | 9.1 |
| Cyclohexane, percent wt. BD | None | 100 |

¹ Flow rate includes cyclohexane solvent, therefore the MFR for BD only was lower. The COD crude contained about 40–43% cyclohexane, Run IV–2.

It is to be understood that small amounts of extraneous solvents may be highly beneficial, e.g., for dissolving and introducing a catalyst which is only slightly soluble in the diolefin monomer. Further, with backmixing according to the invention, yields are good even in the presence of large amounts of extraneous solvent.

Wherever an organic compound is named herein by its general name, it is intended that the name designate the isomer, if any, which is commonly understood to be meant. Thus, "butadiene" means 1,3-butadiene, and "vinylcyclohexene" means 1,4 - vinylcyclohexene. The symmetrical isomers of the cyclopolyolefins are intended wherever these compounds are mentioned; thus "cyclooctadiene" is intended to mean 1,5-cyclooctadiene, and "cyclododecatriene" means 1,5,9-cyclododecatriene. It is to be noted, however, that compounds of the latter type may be isomerized under certain conditions to give isomers wherein the double bonds are in different positions or to give the various stereo isomers. Specific isomers are inherent in the use of certain conditions.

As pointed out above, all of the products of reaction are backmixed. Where butadiene is the monomer, the backmixed material comprises catalyst, unreacted butadiene cyclooctadiene, cyclododecatriene, cyclohexadecatriene, vinylcyclohexene, and higher polymers. Similarly, other diolefins give a complex reaction mixture.

Uses for the products are known in the art. The cyclopolyolefins may be hydrogenated or partially hydrogenated to then make other derivatives having known utility, e.g. to make organic acids such as suberic acid. Also, 1,5,9-cyclododecatriene is suitable to make organic acids. The "byproducts" are useful. Vinylcyclohexene is a suitable comonomer to react with other monomers for the production of synthetic resins. In some cases small amounts of polymers useful as coating materials are obtained as a residue after recovery of the cycloolefinic products.

The diolefins useful according to the invention are those produced by conventional processes. For instance, the butadiene used in the above examples was prepared in a commercial plant by the dehydrogenation of butene, followed by purification with cuprous ammonium acetate. A crystalline complex of the cuprous ammonium acetate with butadiene is formed, and the butadiene is released from the complex by the application of heat. As has been known since 1950 and earlier, from commercial butadiene plant operation in this country, this process gives butadiene of about 95% to 99% purity with little variation for a given set of conditions.

The butadiene used in the above examples was ordinary "plant" butadiene not subjected to any particular purification procedures, except in most cases the material was passed through a column of silica gel to remove excessive amounts of water and apparently a substantial proportion of the polymerization inhibitors such as paratertiary butylcatechol. The butadiene was obtained from the plant of Petroleum Chemicals Incorporated, Lake Charles, Louisiana. Analyses of butadiene, typical of the butadiene which was used in these examples are as follows:

| Component: | Proportion by weight, percent |
|---|---|
| Butadiene-1,3 | 98.36 |
| Isobutane | 0.00 |
| n-Butane | 0.00 |
| Isobutylene | 0.025 |
| Trans-butene-2 | 0.065 |
| Cis-butene-2 | 0.065 |
| Propylene | 0.58 |
| Propadiene | 0.075 |
| Butadiene-1,2 | 0.10 |
| Acetylenes (including methylacetylene, ethylacetylene, vinylacetylene, and dimethylacetylene | 0.06 |
| Carbonyl | 0.002 |
| Water | 0.02 |

Isobutane and n-butane are commonly present in small amounts. The total acetylenes commonly range from about 0.05% to 0.09% by weight in butadiene of about 98.5% purity. The acetylenic constituents of a similar butadiene sample were analyzed by gas chromatography, and the following compounds and amounts were found:

| Component: | Mole percent |
|---|---|
| Methylacetylene | 0.02 |
| Ethylacetylene | 0.04 |
| Dimethylacetylene | 0.01 |
| Vinylacetylene | 0.002 |

As can be seen, the diolefin as used in the examples contained other unsaturated hydrocarbons having 3–4 carbon atoms.

I claim:
1. In a method of continuously reacting substituted or unsubstituted conjugated open-chain diolefins to give a polyolefinic cyclooligomer of said diolefin, said cyclooligomer having at least eight cyclic carbon atoms, which method comprises the steps of continuously introducing said diolefin into a reaction zone, introducing a catalyst into said reaction zone, said catalyst comprising zerovalent nickel and having the empirical formula

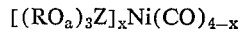

$$[(RO_a)_3Z]_xNi(CO)_{4-x}$$

wherein R is an organic radical, Z is selected from the group of trivalent elements phosphorus, arsenic, and antimony, "$a$" is from one to zero, and "$x$" is between one and four inclusive, the quantity of said catalyst being between about 0.001 and 10%, based on the weight of said diolefin, heating the contents of said reaction zone to a temperature between about 40° C. and 250° C., applying a pressure throughout the reaction zone at least equivalent to the vapor pressure of the reaction mixture, said catalyst being in solution in said mixture, and continuously withdrawing a part of the reactiion mixture including products of a reaction as final products; the improvement comprising continuously backmixing the balance of the reaction mixture with said diolefin introduced; controlling the volume of reaction mixture, the rate of introduction of diolefin, and the rate of withdrawal of reaction mixture as final product to give a mass flow rate of between about 0.01 and about 10 grams of said diolefin introduced per millilitre of volume of liquid-occupied space in said reaction zone per hour; maintaining a substantially constant concentration of said diolefin in said reaction mixture at a point in the range of 3–60% by weight of the reaction mixture, and maintaining a relatively uniform composition of said reaction mixture throughout said occupied space by the backmixing per unit of time at least an amount of the reaction mixture equal in weight to the weight of diolefin introduced.

2. The process of claim 1 in which said catalyst is introduced into the reaction zone in solution in a portion of a liquid product of reaction.

3. The process of claim 1 in which said diolefin is isoprene.

4. The process of claim 1 in which said diolefin is chloroprene.

5. The process of claim 1 in which said liquid reaction mixture consists essentially of said diolefin, said catalyst, and products derived therefrom, and the reaction is conducted in the absence of extraneous solvent.

6. The process of claim 1 comprising the step of externally backmixing said liquid mixture with said diolefin.

7. The process of claim 1 in which said diolefin is butadiene.

8. The process of claim 1 in which said diolefin is impure 1,3-butadiene containing other unsaturated hydrocarbons.

9. The process of claim 8 in which said other unsaturated hydrocarbons comprise acetylenic compounds.

10. The method of claim 1 comprising the step of internally backmixing said liquid mixture with said diolefin.

11. The process of claim 10 which comprises the step of externally backmixing a part of said liquid mixture with said diolefin, at the same time as said internal backmixing is taking place.

12. The process of claim 1 in which said catalyst is one wherein Z is phosphorus, "$a$" is one, and "$x$" is two.

13. The process of claim 12 in which said diolefin is butadiene.

14. The method of claim 13 in which R is phenyl, the temperature is between about 140° C. and 190° C., the mass flow rate is between about 0.1 and 4.0 grams of butadiene per hour per milliliter of volume of reactor occupied by liquid, and the products comprise cyclooctadiene and cyclododecatriene.

15. The process of claim 14 in which the reaction is controlled to give a butadiene concentration of about 5 to 50%

16. The method of claim 13 in which R is phenyl, the temperature is between about 120° C. and 180° C., and the mass flow rate is between about 0.01 and 1.0 grams of butadiene, introduced per hour per milliliter of volume of reactor occupied by liquid, whereby the yield of cyclooctadiene is enhanced, and the yield of cyclododecatriene is diminished.

17. The process of claim 16 in which the variables of backmixing, mass flow rate, temperature, and catalyst concentration are so controlled that the concentration of butadiene in the reaction mixture is between about 5% and 25%.

18. The process of claim 13 in which the catalyst is bis(triphenylphosphite) nickel dicarbonyl, the products comprise cyclooctadiene, cyclododecatriene, and higher molecular weight cycloologimers of butadiene, the further improvement of enhancing the ratio of cyclododecatriene to cyclooctadiene by maintaining the mass flow rate between about 1.0 and 5.0 grams of butadiene per hour per milliliter of reactor volume occupied by liquid, and holding the temperature between about 150° C. and 200° C.

19. The process of claim 18 comprising the step of controlling the conditions so that the concentration of butadiene in the reaction mixture is between about 25 and 60%.

20. The process of claim 1 in which the catalyst is one wherein Z is phosphorus, "$a$" is one, and "$x$" is three.

21. The process of claim 20 in which said diolefin is butadiene.

22. The process of claim 20 in which R is aryl.

23. The process of claim 1 in which the diolefin is butadiene and the reaction products comprise cyclooctadienne, cyclododecatriene, and higher molecular weight cyclooligomers of butadiene, the further improvement of enhancing the ratio of cyclooctadiene to cyclododecatriene by steps comprising the introduction of tris-(triphenylphosphite) nickel carbonyl as catalyst, maintaining the mass flow rate at between about 0.01 and 1 gram of butadiene per hour per milliliter of volume of reactor occupied by liquid, and keeping the reation temperature between about 100° C. and 160° C.

24. The process of claim 23 in which the combination of mass flow rate, catalyst concentration, and temperature is such that a concentration of between about 3% and 20% of butadiene based on the weight of the reaction mixture, is maintained in the reaction zone.

25. The process of claim 1 in which the diolefin is butadiene and the reaction products comprise cyclooctadiene, cyclododecatriene, and higher molecular weight cyclooligomers of butadiene, the further improvement of enhancing the ratio of cyclododecatriene to cyclooctadiene by steps comprising the introduction of tris(triphenylphosphite) nickel carbonyl as catalyst, maintaining the mass flow rate at between about 1.0 and 10 grams of butadiene per hour per milliliter of volume of reactor occupied by liquid, and holding the temperature between about 160° C. and 220° C.

26. The proess of claim 25 in which the mass flow rate is between about 1.0 and 4.0, the temperature is between about 160° C. and 200° C., and the combination of mass flow rate, catalyst concentration, and temperature is such that the concentration of butadiene, based on the weight of the reaction mixture, is between about 20% and 60%.

27. The process of claim 1 in which the diolefin is butadiene and the reaction products comprise cyclooctadiene, cyclododecatriene, and higher molecular weight cyclooligomers of butadiene, the further improvement of enhancing the yields of all of said cyclooligomers of butadiene by steps comprising the introduction of tris(triphenylphosphite) nickel carbonyl as catalyst, maintaining the mass flow rate at between about 0.01 and 4.0 grams of butadiene per hour per milliliter of volume of reactor occupied by liquid, and keeping the reaction temperature between about 120° C. and 200° C.

28. The process of claim 27 in which the combination of mass flow rate, catalyst concentration, and temperature is such that the dependent variable of butadiene concentration in the reaction mixture is kept between about 5% and 60%.

29. The process of claim 1 in which said catalyst is one wherein Z is phosphorus, "$a$" is one, and "$x$" is four.

30. The process of claim 29 in which said diolefin is butadiene.

31. The process of claim 29 in which R is aryl.

References Cited by the Examiner
UNITED STATES PATENTS

| | | | |
|---|---|---|---|
| 2,521,939 | 9/1950 | Oriolo | 260—683.15 |
| 2,634,257 | 4/1953 | Faragher | 260—666 |
| 2,761,889 | 9/1956 | May et al. | 260—683.15 |
| 2,755,324 | 7/1956 | Mueller | 260—683.15 |
| 2,964,575 | 12/1960 | Sekul et al. | 260—666 |
| 2,972,640 | 2/1961 | Burks et al. | 260—666 |
| 3,004,081 | 10/1961 | Bosmajian | 260—666 |

DELBERT E. GANTZ, *Primary Examiner.*

ALPHONSO D. SULLIVAN, *Examiner.*

C. E. SPRESSER, *Assistant Examiner.*

UNITED STATES PATENT OFFICE
CERTIFICATE OF CORRECTION

Patent No. 3,272,876　　　　　　　　　　　　　　September 13, 1966

Ralph Levine

It is hereby certified that error appears in the above numbered patent requiring correction and that the said Letters Patent should read as corrected below.

Column 1, line 61, for "apparaus" read -- apparatus --; column 2, line 57, for "volences" read -- valences --; column 3, line 15, for "-toly" read -- -tolyl --; column 4, line 33, for "selectively" read -- selectivity --; column 6, line 45, for "butadiene concentration" read -- butadiene of between about 0.01 and 1 g./ml.-hr., and a butadiene concentration --; line 72, for "tris(trihenylphosphite)" read -- tris(triphenylphosphite) --; column 7, line 20, for "mas" read -- mass --; column 8, line 23, for "this" read -- this and --.

Signed and sealed this 22nd day of August 1967.

(SEAL)
Attest:

ERNEST W. SWIDER　　　　　　　　　　　　　　　EDWARD J. BRENNER
Attesting Officer　　　　　　　　　　　　　　Commissioner of Patents

UNITED STATES PATENT OFFICE
CERTIFICATE OF CORRECTION

Patent No. 3,272,876　　　　　　　　　　　　September 13, 1966

Ralph Levine

It is hereby certified that error appears in the above numbered patent requiring correction and that the said Letters Patent should read as corrected below.

Column 1, line 61, for "apparaus" read -- apparatus --; column 2, line 57, for "volences" read -- valences --; column 3, line 15, for "-toly" read -- -tolyl --; column 4, line 33, for "selectively" read -- selectivity --; column 6, line 45, for "butadiene concentration" read -- butadiene of between about 0.01 and 1 g./ml.-hr., and a butadiene concentration --; line 72, for "tris(trihenylphosphite)" read -- tris(triphenylphosphite) --; column 7, line 20, for "mas" read -- mass --; column 8, line 23, for "this" read -- this and --.

Signed and sealed this 22nd day of August 1967.

(SEAL)
Attest:

ERNEST W. SWIDER
Attesting Officer

EDWARD J. BRENNER
Commissioner of Patents